US012560231B2

(12) United States Patent
Li et al.

(10) Patent No.: US 12,560,231 B2
(45) Date of Patent: Feb. 24, 2026

(54) ELECTRICALLY DRIVEN GEARBOX ASSEMBLY HAVING STEPPED HOLE POSITIONING

(71) Applicant: Jing-Jin Electric Technologies Co., Ltd., Beijing (CN)

(72) Inventors: Jianwen Li, Beijing (CN); Xudong Yang, Beijing (CN); Jiaqi Li, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 18/726,379

(22) PCT Filed: May 16, 2022

(86) PCT No.: PCT/CN2022/093019
§ 371 (c)(1),
(2) Date: Jul. 2, 2024

(87) PCT Pub. No.: WO2023/130641
PCT Pub. Date: Jul. 13, 2023

(65) Prior Publication Data
US 2025/0067331 A1      Feb. 27, 2025

(30) Foreign Application Priority Data
Jan. 4, 2022     (CN) .......................... 202210002945.1

(51) Int. Cl.
*F16H 57/021*       (2012.01)
*F16H 57/027*       (2012.01)
*F16H 57/02*        (2012.01)

(52) U.S. Cl.
CPC ......... *F16H 57/021* (2013.01); *F16H 57/027* (2013.01); *F16H 2057/02021* (2013.01)

(58) Field of Classification Search
CPC ................. F16H 57/021; F16H 57/027; F16H 2057/02021
See application file for complete search history.

(56) References Cited

U.S. PATENT DOCUMENTS 5,404,772 A * 4/1995 Jester ................... F16H 57/022
74/606 R
2021/0332877 A1   10/2021  Li et al.

FOREIGN PATENT DOCUMENTS

CN        201413409 Y      2/2010
CN        106938382 A      7/2017
(Continued)

OTHER PUBLICATIONS

Machine translation of DE 102019208491A1 obtained from fit database (Year: 2020).*

(Continued)

*Primary Examiner* — Thomas C Diaz
(74) *Attorney, Agent, or Firm* — ARENTFOX SCHIFF LLP

(57) ABSTRACT

The utility model discloses a stepped hole positioning electric drive gearbox assembly. The stepped hole positioning electric drive gearbox assembly specifically comprises a first shell, a second shell and a positioning pin. A first positioning hole is formed in the connecting surface of the first shell, a second positioning hole corresponding to the first positioning hole is formed in the second shell, and the first shell and the second shell are in positioning connection through the first positioning hole, the second positioning hole and a positioning pin; the first positioning hole and/or the second positioning hole are/is stepped holes, each stepped hole comprises a guiding section close to the hole opening and a matching section away from the hole opening, the hole diameter of the guiding section is larger than that of the matching section, and the guiding section is used for guiding (Continued)

the positioning pin to enter the matching section. In the electric drive gearbox assembly, the first shell can be pre-positioned when being assembled with the second shell, and the first shell can be radially adjusted relative to the second shell during pre-positioning, so that the first shell and the second shell can be conveniently positioned and assembled, and the electric drive gearbox assembly can be automatically and massively assembled.

10 Claims, 5 Drawing Sheets

(56)                        References Cited

FOREIGN PATENT DOCUMENTS

| | | | | | |
|----|------------|---|---------|----------|-----------|
| CN | 206929338 | U | * | 1/2018 | ............. F16H 57/02 |
| CN | 108194621 | A | | 6/2018 | |
| CN | 108674179 | A | | 10/2018 | |
| CN | 211640795 | U | | 10/2020 | |
| CN | 112377598 | A | | 2/2021 | |
| CN | 214171273 | U | | 9/2021 | |
| CN | 214788944 | U | | 11/2021 | |
| CN | 114483921 | A | | 5/2022 | |
| CN | 217583088 | U | | 10/2022 | |
| DE | 102017213902 | A1 | | 2/2019 | |
| DE | 102019208491 | A1 | * | 12/2020 | .......... F16H 57/023 |
| EP | 1426639 | A1 | | 6/2004 | |
| EP | 3620686 | A1 | | 3/2020 | |
| JP | S55-094958 | U | | 7/1980 | |
| JP | H03-249460 | A | | 11/1991 | |
| JP | 2009008243 | A | | 1/2009 | |
| JP | 2010-036748 | A | | 2/2010 | |
| JP | 2021-097185 | A | | 6/2021 | |

OTHER PUBLICATIONS

International Search Report issued in International Patent Application No. PCT/CN2022/093019, mailed Sep. 29, 2022, 6 pages.
European Search Report received for Patent Application No. 22918100.3, Mailed on Mar. 21, 2025, 4 Pages.
Office Action received for Chinese Patent Application No. 202210002945.1, mailed on Jun. 6, 2025, 14 pages (6 pages of English Translation and 8 pages of Original Office Action).
Office Action received for Japanese Patent Application No. 2024-540033, mailed on Sep. 9, 2025, 10 pages (5 pages of English Translation and 5 pages of Original Document).

* cited by examiner

10

ELECTRICALLY DRIVEN GEARBOX ASSEMBLY HAVING STEPPED HOLE POSITIONING

CROSS-REFERENCE TO RELATED APPLICATION

This application is a National Phase of PCT/CN2022/093019 filed on May 16, 2022, which claims priority to the Chinese patent application No. 202210002945.1 filed with the Chinese Patent Office on Jan. 4, 2022, the contents of each of which are hereby incorporated by reference in their entireties.

TECHNICAL FIELD

The present disclosure belongs to the technical field of electric drive assemblies, and particularly relates to an electric drive gearbox assembly with stepped hole positioning.

BACKGROUND

With the continuous development of the automotive industry, people have higher and higher requirements for the structural setting of the gearbox and the entire automotive power system. In order to reduce the axial size of the powertrain, most powertrains adopt an integrated shaft structure supported by multiple bearings. Moreover, the housings of the powertrain are usually positioned and connected by positioning pins and positioning holes. In the process of assembling a housing assembly equipped with a bearing outer ring and a bearing roller to another housing assembly equipped with a bearing inner ring, there is not enough offset space between the positioning pin and the positioning hole, so the bearing roller and the bearing inner ring compress each other during the assembly process, which causes scratches on the surface of the bearing raceway; and further affects the performance and life of the bearing and the entire power system.

In response to this problem, the existing patent "Electric drive power transmission system housing assembly with stepped pin positioning and its installation method" (application number: CN202110202229.3) proposes using a stepped pin to prevent the occurrence of scratches on the surface of the bearing raceway caused by the compressing between the bearing outer ring and the bearing roller. However, since the structures of two ends of the stepped pin are different, when a first housing and an intermediate housing are assembled in batches through stepped pins, it is easy to have the ends of stepped pin installed in reverse, thereby resulting in invalid assembly and further affecting the assembly efficiency.

SUMMARY

With respect to the above problems, the present disclosure provides an electric drive gearbox assembly with stepped hole positioning to overcome the above problems or at least partially solve the above problems.

To achieve the above object, the present disclosure adopts the following technical solutions.

An electric drive gearbox assembly with stepped hole positioning, comprising a first housing, a second housing and a positioning pin;

wherein the first housing is provided with a first positioning hole on its connecting surface, the second housing is provided with a second positioning hole corresponding to the first positioning hole, and the first housing and the second housing are positioned and connected through the first positioning hole, the second positioning hole and the positioning pin;

the first positioning hole and/or the second positioning hole are stepped holes, the stepped hole comprises a guiding section close to an open end of the stepped hole and an engaging section far away from the open end of the stepped hole, an aperture of the guiding section is larger than an aperture of the engaging section, and the guiding section is used to guide the positioning pin into the engaging section.

Further, the aperture of the engaging section in the stepped hole is same as a diameter of the positioning pin; or, the engaging section is in an interference fit with the positioning pin.

Further, a ventilation groove arranged axially is provided on an outer surface of the positioning pin.

Further, a ventilation hole is provided on the first housing and/or the second housing, and the ventilation hole is communicated to the engaging section.

Further, an end of the positioning pin is provided with a guide slope or a guide arc surface.

Further, the stepped hole further comprises a directing section arranged between the guiding section and the engaging section, and the directing section is used to guide the positioning pin into the engaging section from the guiding section.

Further, the electric drive gearbox assembly further comprises a power shaft, wherein one end of the power shaft is supportedly connected to the first housing through a first bearing, and a middle position of the power shaft is supportedly connected to the second housing through a second bearing.

Further, an inner ring of the first bearing is fixedly connected to the power shaft, and an outer ring of the first bearing is fixedly connected to the first housing.

Further, in the stepped hole, a gap between the guiding section and the positioning pin satisfies the following condition: during an assembly process, when more than half, in an axial direction, of an roller of the first bearing enters an inner ring raceway of the first bearing, a radial space is maintained between the inner ring of the first bearing and the roller of the first bearing and between the outer ring of the first bearing and the roller of the first bearing.

Further, in the stepped hole, axial lengths of the guiding section and the engaging section are determined according to axial sizes of the first bearing, the first housing and the power shaft.

The advantages and beneficial effects of the present disclosure are as follows.

In the electric drive gearbox assembly of the present disclosure, by setting the first positioning hole on the first housing and/or the second positioning hole on the second housing as stepped holes, the radial gap between the guiding section of the stepped hole and the positioning pin can be used to achieve the pre-positioning of the first housing and the second housing, and the first housing can be radially adjusted relative to the second housing during the pre-positioning, so as to facilitate the positioning and assembly of the first housing and the second housing. In addition, since both ends of the positioning pin can be engaged with the first positioning hole and the second positioning hole, invalid assembly can be avoided when the positioning pin is assembled and positioning in the first positioning hole and the second positioning hole, thereby achieving the automated and batch assembly of the electric drive assembly.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings.

Figure 1:
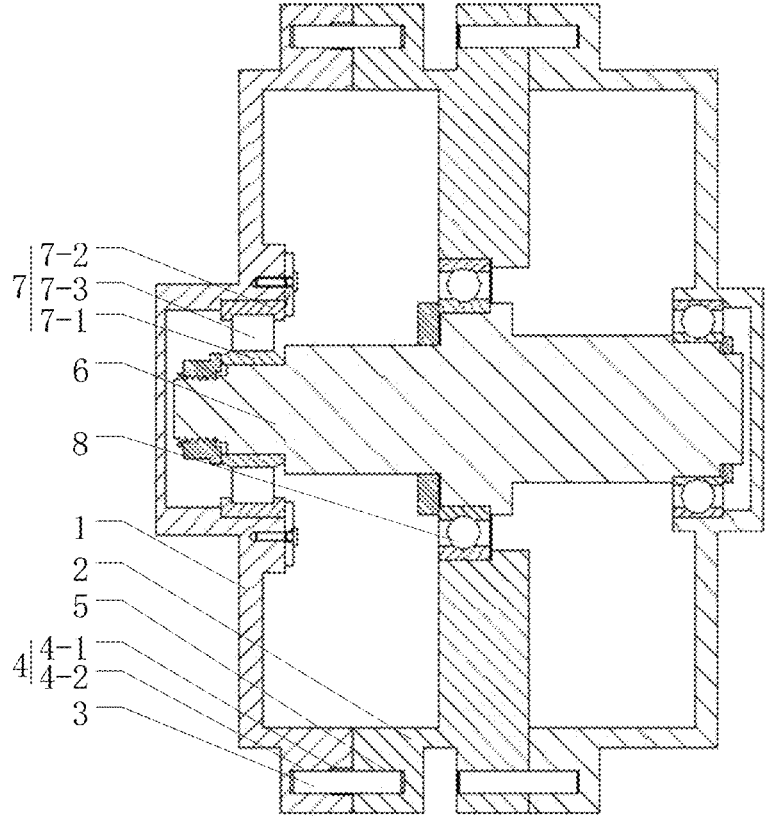
FIG. 1 is an axial cross-sectional view of an electric drive gearbox assembly in a first embodiment of the present disclosure.

In the drawings: 1, first housing; 2, second housing; 3, positioning pin; 4, first positioning hole; 4-1, guiding section; 4-2, engaging section; 5, second positioning hole; 6, power shaft; 7, first bearing; 7-1, inner ring of the first bearing; 7-2, outer ring of the first bearing; 7-3, roller of the first bearing; 8, second bearing; 9, ventilation groove; 10, ventilation hole; 11, guide slope; 12, guide arc surface.

DETAILED DESCRIPTION

In order to make the object, technical solutions, and advantages of the present disclosure clearer, the present disclosure will be described clearly and completely in conjunction with the specific embodiments and corresponding drawings. Obviously, the embodiments described are only part of rather than all of the embodiments of the present disclosure. Based on the embodiments in the present disclosure, all other embodiments obtained by those of ordinary skill in the art without paying creative work shall fall within the protection scope of the present disclosure.

The technical solutions provided by the embodiments of the present disclosure will be described in detail below in conjunction with the accompanying drawings.

First Embodiment

This embodiment provides an electric drive gearbox assembly with stepped hole positioning. As shown in FIGS. 1 to 4, the electric drive gearbox assembly comprises a first housing 1, a second housing 2 and a positioning pin 3. The radial cross section of the positioning pin 3 may be a circle or a regular polygon, or other shapes.

Specifically, a first positioning hole 4 is provided on a connection surface of the first housing 1 where the first housing 1 and the second housing 2 are connected. The specific number and position of the first positioning hole 4 can be adjusted as needed. A second positioning hole 5 corresponding to the first positioning hole 4 is provided on the second housing 2. The first housing 1 and the second housing 2 are positioned and connected through the first positioning hole 4, the second positioning hole 5 and the positioning pin 3. That is, two ends of the positioning pin 3 are respectively inserted into the first positioning hole 4 and the second positioning hole 5 to achieve relative fixation of the first housing 1 and the second housing 2.

The first positioning hole 4 is a stepped hole. Specifically, it comprises a guiding section 4-1 close to an open end of the stepped hole and an engaging section 4-2 far away from the open end of the stepped hole, the aperture of the guiding section 4-1 is larger than the aperture of the engaging section 4-2, and the guiding section 4-1 is used to guide the positioning pin 3 into the engaging section 4-2. Moreover, the second positioning hole 5 and the positioning pin 3 are preferably in an interference fit. In this way, when the first housing 1 and the second housing 2 are assembled through the positioning pin 3, one end of the positioning pin 3 is first inserted into the second positioning hole 5, and then when the other end of the positioning pin 3 is inserted into the guiding section 4-1 in the first positioning hole 4, the positioning pin 3 and the first positioning hole 4 are pre-positioned, that is, the first housing 1 and the second housing 2 are pre-positioned. At this point, due to the radial gap between the positioning pin 3 and the guiding section 4-1, the first housing 1 can be radially adjusted relative to the second housing 2; when the end of the positioning pin 3 enters the engaging section 4-2 from the guiding section 4-1 in the first positioning hole 4, the first housing 1 and the second housing 2 are radially positioned.

Of course, in other embodiments, alternatively, the second positioning hole is a stepped hole and the first positioning hole is a straight hole; or, the first positioning hole and the second positioning hole are both stepped holes.

In sum, in the electric drive gearbox assembly of this embodiment, by setting the first positioning hole on the first housing and/or the second positioning hole on the second housing as stepped holes, the radial gap between the guiding section of the stepped hole and the positioning pin can be used to achieve the pre-positioning of the first housing and the second housing, and the first housing can be radially adjusted relative to the second housing during the pre-positioning, so as to facilitate the positioning and assembly of the first housing and the second housing. In addition, since both ends of the positioning pin can be engaged with the first positioning hole and the second positioning hole, invalid assembly can be avoided when the positioning pin is assembled and positioning in the first positioning hole and the second positioning hole, thereby improving the assembly efficiency and promoting the automated and batch assembly of the electric drive assembly.

In this embodiment, the aperture of the engaging section in the stepped hole is the same as the diameter of the positioning pin. By setting them the same, the accuracy of the assembly of the first housing and the second housing can be improved, and the electric drive gearbox assembly can be effectively prevented from loosening due to long-term vibration or generating abnormal noise. Of course, in other embodiments, alternatively, the engaging section and the positioning pin may be engaged in an interference fit to achieve firm and fixed connection between the first housing and the second housing.

Further, a ventilation groove 9 arranged axially is provided on the outer surface of the positioning pin. When the end of the positioning pin enters the engaging section from the guiding section, the gas between the positioning pin and the engaging section is discharged through the ventilation groove 9, so that the positioning pin can smoothly enter the engaging section.

In this embodiment, the first positioning hole further comprises a directing section arranged between the guiding section and the engaging section, and the directing section is used to guide the positioning pin into the engaging section from the guiding section, so that the end of the positioning pin can more easily and accurately enter the engaging section from the guiding section, thereby improving the assembly efficiency.

In this embodiment, as shown in FIGS. 1 to 4, the electric drive gearbox assembly further comprises a power shaft 6, one end of the power shaft 6 is supportedly connected to the first housing 1 through a first bearing 7, and a middle position of the power shaft 6 is supportedly connected to the second housing 2 through a second bearing 8.

The inner ring 7-1 of the first bearing is fixedly connected to the power shaft 6, the outer ring 7-2 of the first bearing is fixedly connected to the first housing 1, and the roller 7-3 of the first bearing is fixed on the outer ring 7-2 of the first bearing.

Moreover, in the first positioning hole, the gap between the guiding section and the positioning pin satisfies the following condition: during the assembly process, when more than half, in an axial direction, of an roller of the first bearing enters an inner ring raceway of the first bearing, a radial space is maintained between the inner ring of the first bearing and the roller of the first bearing and between the outer ring of the first bearing and the roller of the first bearing.

In addition, in the first positioning hole, axial lengths of the guiding section and the engaging section are determined according to axial sizes of the first bearing, the first housing and the power shaft. Specifically, the axial length of the guiding section is determined so that when the end of the positioning pin is inserted into an initial or middle position of the guiding section, the outer ring of the first bearing, the roller of the first bearing and the inner ring of the first bearing are in the initial assembly position; when the end of the positioning pin is inserted into a tail end of the guiding section, at least half of the roller of the first bearing enters the inner ring slideway of the first bearing. The axial length of the engaging section is determined so that when the end of the positioning pin is fully inserted into the engaging section, the remaining part of the roller of the first bearing completely enters the inner ring raceway of the first bearing.

Figure 2:
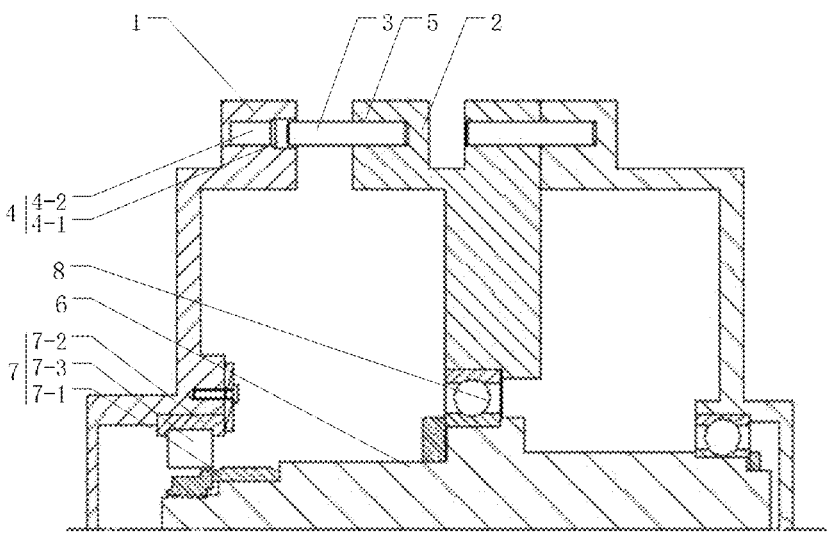
FIG. 2 is a cross-sectional view of an initial stage of the assembly process of a first bearing of the electric drive gearbox assembly in the first embodiment of the present disclosure.
Figures 3, 4:
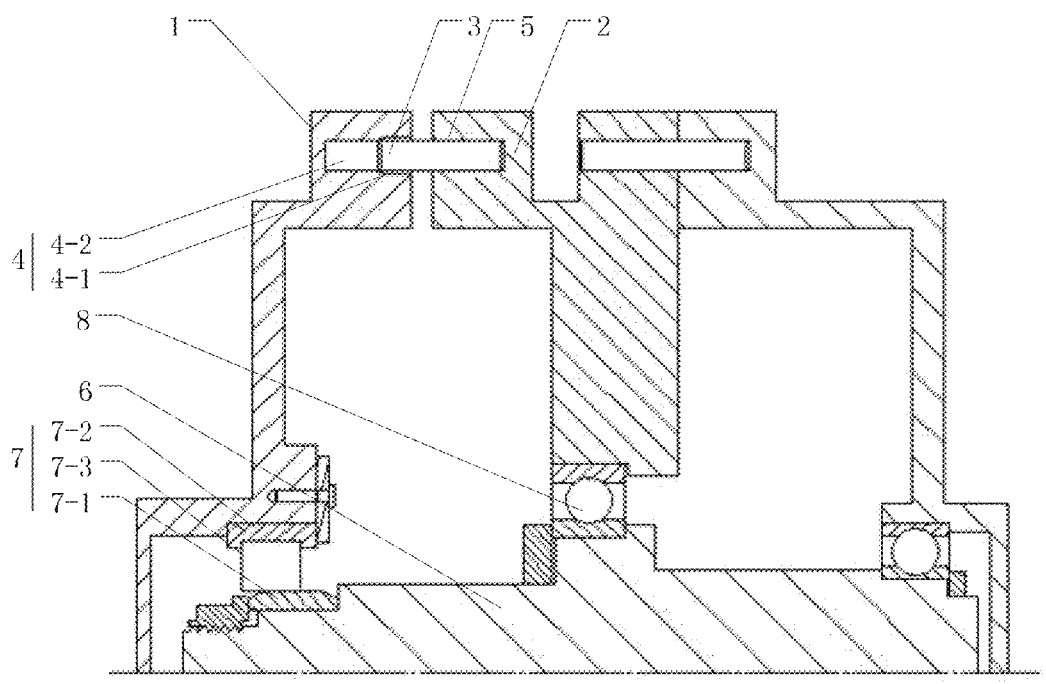
FIG. 3 is a cross-sectional view of a stage of the assembly process of a first bearing of the electric drive gearbox assembly in the first embodiment of the present disclosure where a positioning pin begins to enter an engaging section of a first positioning hole.
FIG. 4 is a cross-sectional view of a stage of the assembly process of a first bearing of the electric drive gearbox assembly in the first embodiment of the present disclosure where a roller of the first bearing completely enters the inner ring raceway.

In this embodiment, when the first housing 1 and the second housing 2 are assembled, as shown in FIG. 2, when the end of the positioning pin 3 is inserted into the guiding section 4-1, the first bearing 7 is in the assembly position. Due to the radial gap between the positioning pin 3 and the guiding section 4-1, the first housing 1 can be radially adjusted relative to the second housing 2, so that there is enough radial space between the inner ring 7-1 of the first bearing and the roller 7-3 of the first bearing, which is convenient for radial adjustment of them, and can prevent the inner ring 7-1 of the first bearing and the roller 7-3 of the first bearing from scratching each other. As shown in FIG. 3, when at least half, in an axial direction, of the roller 7-3 of the first bearing enters the inner ring raceway of the first bearing, the end of the positioning pin 3 begins to enter the engaging section 4-2; when an end of the positioning pin 3 is inserted into the engaging section 4-2, as shown in FIG. 4, the roller 7-3 of the first bearing completely enters the inner ring raceway of the first bearing, that is, the assembly of the first bearing 7 is completed.

By setting the first positioning hole as a stepped hole, the stepped engaging of the positioning pin and the stepped hole is achieved, which can prevent scratches on the surface of the inner ring raceway of the first bearing caused by compressing between the inner ring and roller of the first bearing during the assembly of the first housing and the second housing, thereby improving the service life of the first bearing and the electric drive gearbox assembly.

Second Embodiment

Figure 5:
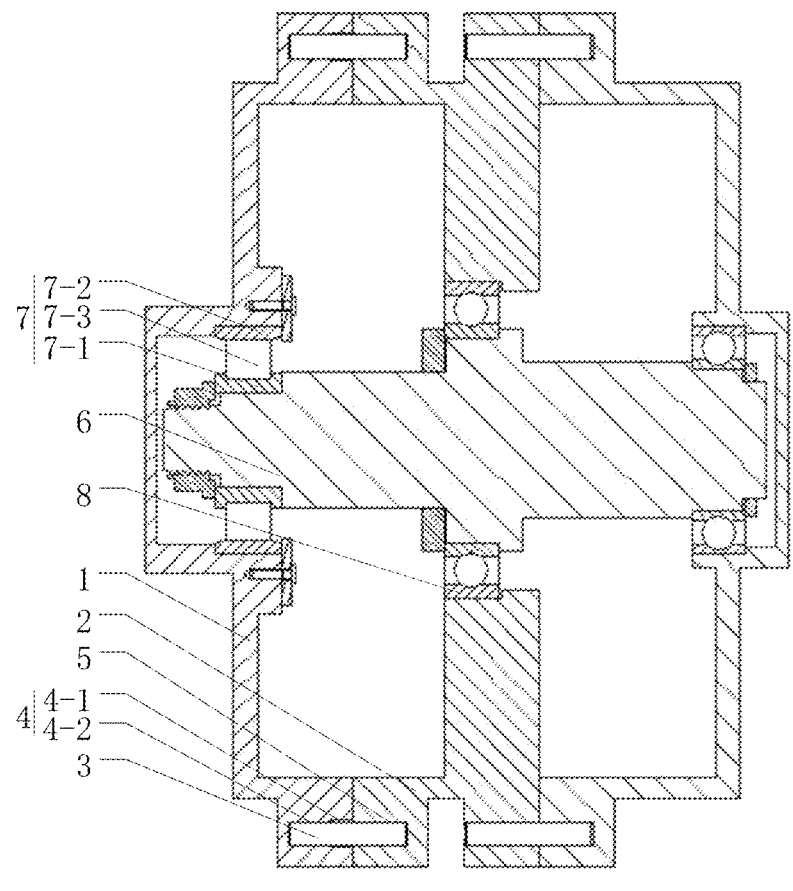
FIG. 5 is an axial cross-sectional view of the electric drive gearbox assembly in a second embodiment of the present disclosure.
Figure 6:
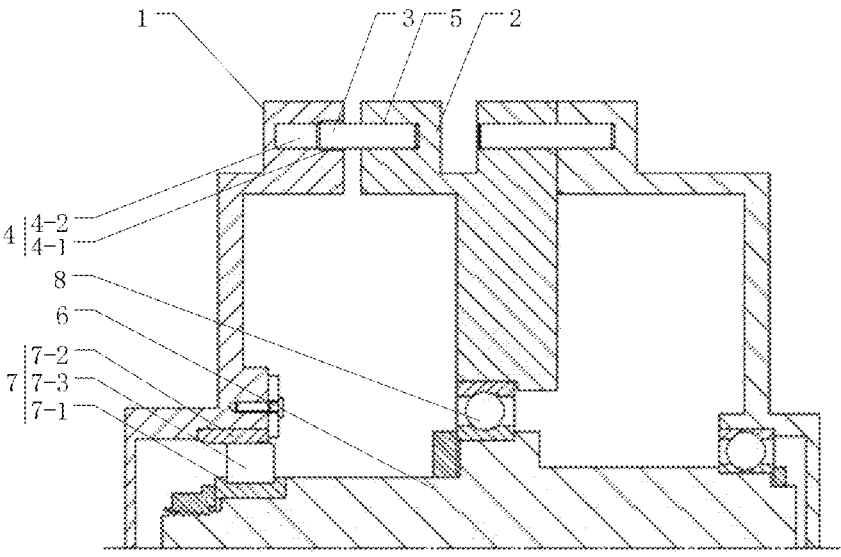
FIG. 6 is a cross-sectional view of a stage of the assembly process of a first bearing of the electric drive gearbox assembly in the second embodiment of the present disclosure where a positioning pin begins to enter an engaging section of a first positioning hole.
Figure 7:
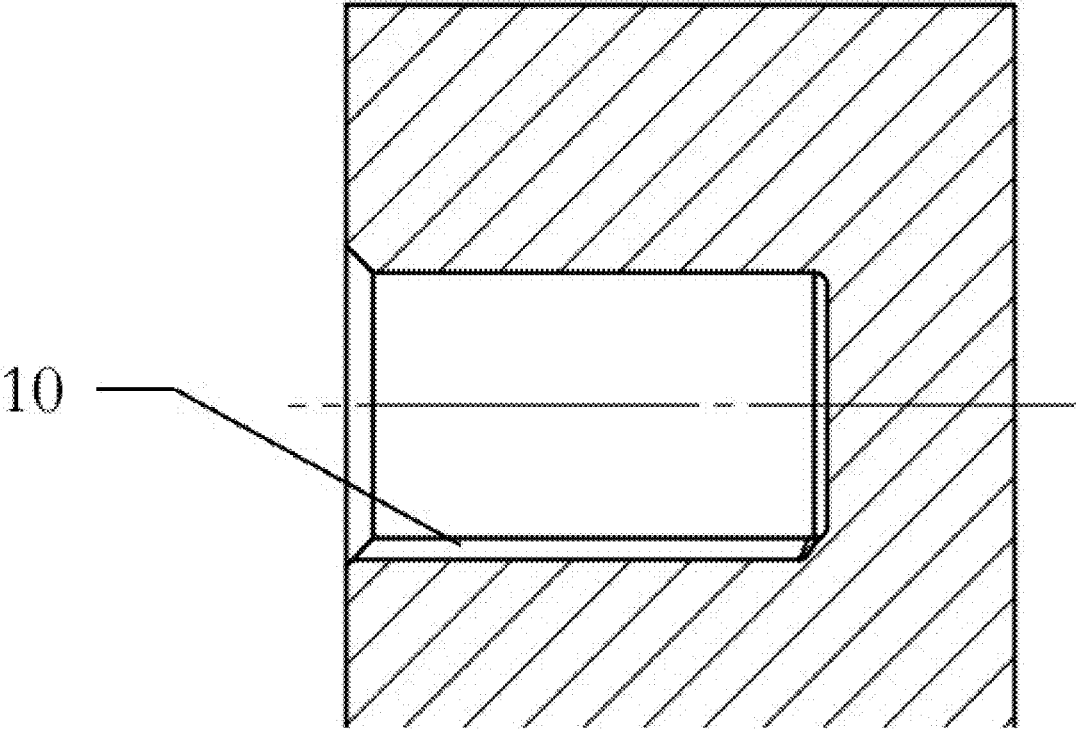
FIG. 7 shows the ventilation hole 10 of the present disclosure.
Figure 8:
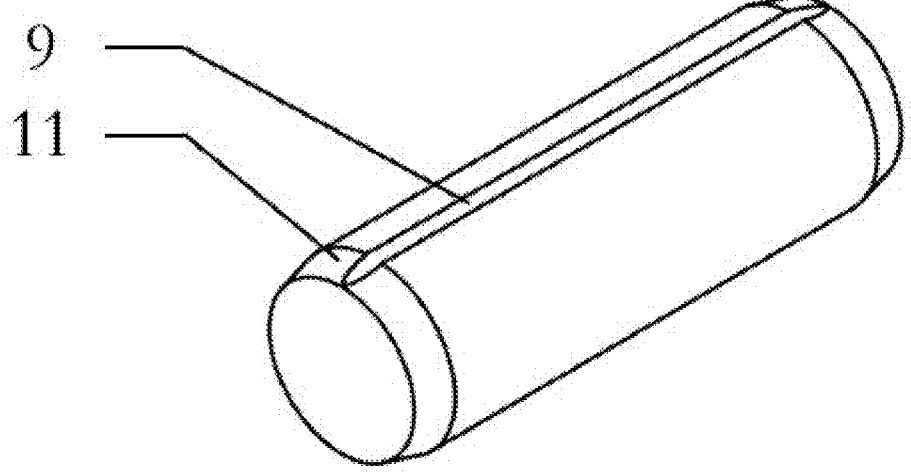
FIG. 8 shows the ventilation groove 9 and guide slope 11 of the present disclosure.
Figure 9:
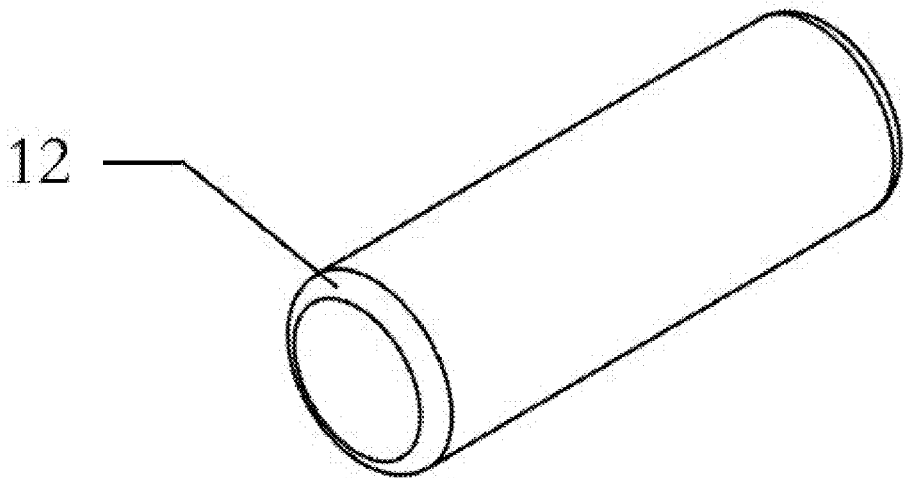
FIG. 9 shows the guide arc surface 12 of the present disclosure.

This embodiment differs from the first embodiment in that, as shown in FIGS. 5 and 6, the inner ring 7-1 of the first bearing is fixedly connected to the power shaft 6, the outer ring 7-2 of the first bearing is fixedly connected to the first housing 1, and the roller 7-3 of the first bearing is fixed to the inner ring 7-1 of the first bearing. At this point, the first bearing can be a split cylindrical roller bearing.

Third Embodiment

This embodiment differs from the first embodiment in that there is not a ventilation groove. In addition, when the first positioning hole and the second positioning hole are both stepped holes, ventilation holes 10 are provided on both the first housing and the second housing, and the ventilation holes 10 are communicated with the engaging section so that when the positioning pin enters the engaging section, the gas between the positioning pin and the engaging section can be discharged through the ventilation holes 10, so that the positioning pin can smoothly enter the engaging section. When only the first positioning hole is a stepped hole, the ventilation hole 10 is provided on the first housing; when only the second positioning hole is a stepped hole, the ventilation hole 10 is provided on the second housing.

Fourth Embodiment

This embodiment differs from the first embodiment in that, an end of the positioning pin is provided with a guide slope 11 or a guide arc surface 12, which facilitates the positioning pin entering the engaging section from the guiding section, thereby reducing the difficulty of assembly.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of explaining the present disclosure, and the protection scope of the present disclosure should be subject to the protection scope of the claims.

What is claimed is:

1. An electric drive gearbox assembly with stepped hole positioning, comprising:

a first housing;

a second housing; and a positioning pin;

wherein the first housing is provided with a first positioning hole on a connecting surface of the first housing, the second housing is provided with a second positioning hole corresponding to the first positioning hole, and the first housing and the second housing are positioned and connected through the first positioning hole, the second positioning hole and the positioning pin, wherein at least one of the first positioning hole and the second positioning hole are stepped holes that comprise a guiding section adjacent to an open end of the stepped hole and an engaging section away from the open end of the stepped hole, and wherein an aperture of the guiding section is larger than an aperture of the engaging section, and the guiding section is configured to guide the positioning pin into the engaging section, wherein the aperture of the engaging section in the stepped hole is same as a diameter of the positioning pin; or, the engaging section is in an interference fit with the positioning pin, and wherein a ventilation groove arranged axially is provided on an outer surface of the positioning pin.

2. The electric drive gearbox assembly according to claim 1, wherein an end of the positioning pin is provided with a guide slope or a guide arc surface.

3. The electric drive gearbox assembly according to claim 1, wherein the stepped hole further comprises a directing section arranged between the guiding section and the engaging section, and the directing section is configured to guide the positioning pin into the engaging section from the guiding section.

4. The electric drive gearbox assembly according to claim 1, further comprising a power shaft, wherein one end of the power shaft is supportedly connected to the first housing through a first bearing, and a middle position of the power shaft is supportedly connected to the second housing through a second bearing.

5. The electric drive gearbox assembly according to claim 4, wherein an inner ring of the first bearing is fixedly connected to the power shaft, and an outer ring of the first bearing is fixedly connected to the first housing.

6. The electric drive gearbox assembly according to claim 5, wherein in the stepped hole, a gap between the guiding section and the positioning pin satisfies the following condition: during an assembly process, when more than half, in an axial direction, of a roller of the first bearing enters an inner ring raceway of the first bearing, a radial space is maintained between the inner ring of the first bearing and the roller of the first bearing and between the outer ring of the first bearing and the roller of the first bearing.

7. The electric drive gearbox assembly according to claim 5, wherein, in the stepped hole, axial lengths of the guiding section and the engaging section are based on axial sizes of the first bearing, the first housing and the power shaft.

8. An electric drive gearbox assembly with stepped hole positioning, comprising:

a first housing;

a second housing; and a positioning pin, wherein the first housing is provided with a first positioning hole on its connecting surface, the second housing is provided with a second positioning hole corresponding to the first positioning hole, and the first housing and the second housing are positioned and connected through the first positioning hole, the second positioning hole and the positioning pin, wherein the first positioning hole and/or the second positioning hole are stepped holes, the stepped hole comprises a guiding section close to an open end of the stepped hole and an engaging section far away from the open end of the stepped hole, an aperture of the guiding section is larger than an aperture of the engaging section, and the guiding section is used to guide the positioning pin into the engaging section, wherein the aperture of the engaging section in the stepped hole is same as a diameter of the positioning pin; or, the engaging section is in an interference fit with the positioning pin, and wherein the ventilation hole is in communication with the engaging section.

9. The electric drive gearbox assembly according to claim 2, further comprising a power shaft having one end supportedly connected to the first housing through a first bearing, and a middle position supportedly connected to the second housing through a second bearing.

10. The electric drive gearbox assembly according to claim 3, further comprising a power shaft having one end supportedly connected to the first housing through a first bearing, and a middle position supportedly connected to the second housing through a second bearing.

* * * * *